No. 763,681. PATENTED JUNE 28, 1904.
C. E. LEFEBVRE.
SYSTEM FOR DISTRIBUTING AND FILTERING LUBRICATING OIL.
APPLICATION FILED JUNE 11, 1903.
NO MODEL.

WITNESSES:

INVENTOR
Charles E. Lefebvre
BY
ATTORNEY.

No. 763,681.

Patented June 28, 1904.

UNITED STATES PATENT OFFICE.

CHARLES E. LEFEBVRE, OF PITTSBURG, PENNSYLVANIA.

SYSTEM FOR DISTRIBUTING AND FILTERING LUBRICATING-OIL.

SPECIFICATION forming part of Letters Patent No. 763,681, dated June 28, 1904.

Application filed June 11, 1903. Serial No. 161,096. (No model.)

*To all whom it may concern:*

Be it known that I, CHARLES E. LEFEBVRE, a citizen of the United States, and a resident of Pittsburg, State of Pennsylvania, have invented certain new and useful Improvements in Systems for Distributing and Filtering Lubricating-Oil, of which the following is a full, clear, and complete disclosure.

Broadly, my invention relates to a system for providing a continuous supply of pure lubricating-oil to bearings of different machines—such as engines, printing-presses, lathes, shaftings, &c.—the oil during its passage through the system being filtered, so that all foreign matters are separated therefrom.

My system also provides for the addition of fresh oil to the system without disturbing the oil already circulating, and all parts are so made that danger of leak and overflow is reduced to a minimum, while at the same time the system is made automatic in its action.

One of the principal advantages of my improved system is in the fact that oil is supplied to the bearings under an even and constant pressure due to the force of gravity, while at the same time the oil as it flows from the bearing after having been used therein is conducted directly to the filtering apparatus before it is again supplied to the pressure-tank.

For a full, clear, and exact description of my invention reference may be had to the following specification and to the accompanying drawings, forming a part thereof, in which—

Figure 1:
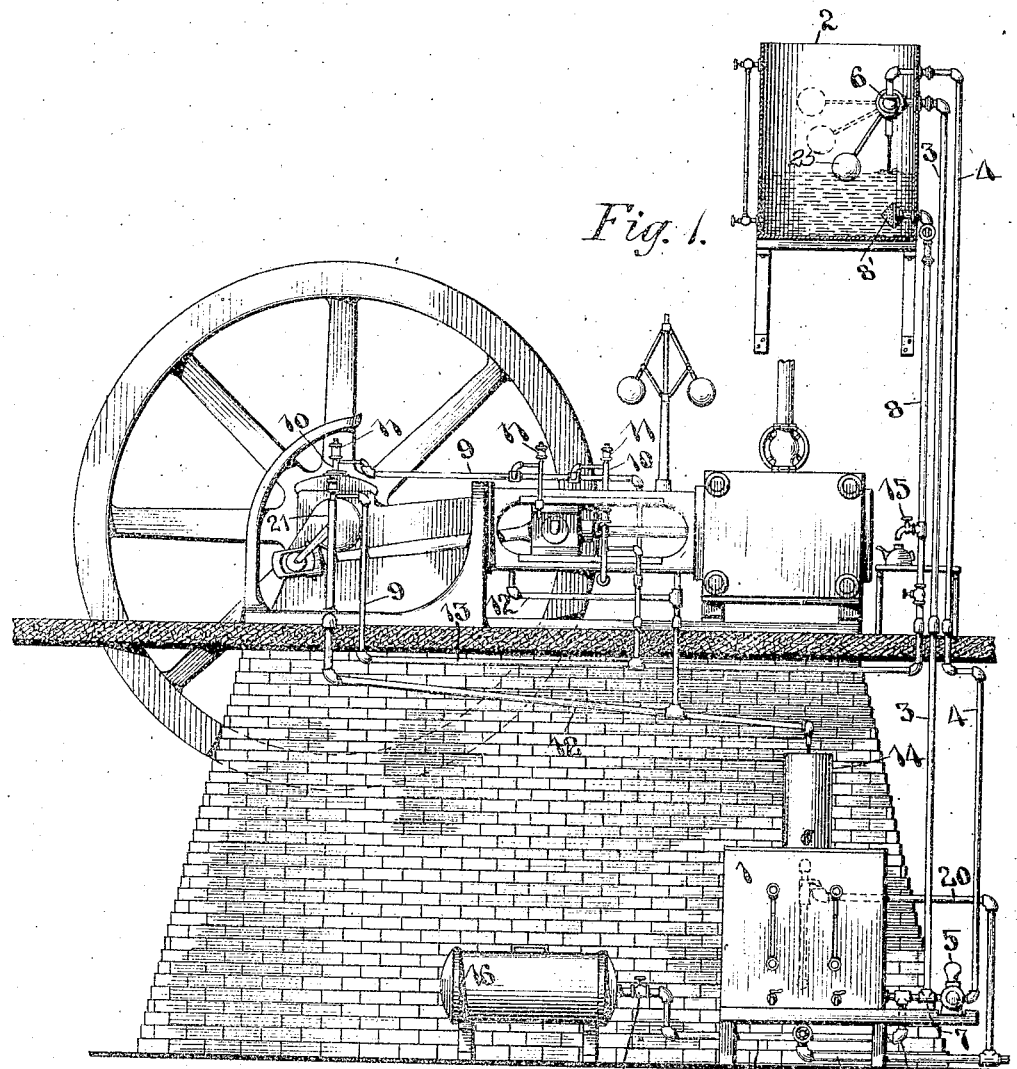
Figures 2, 3, 4:
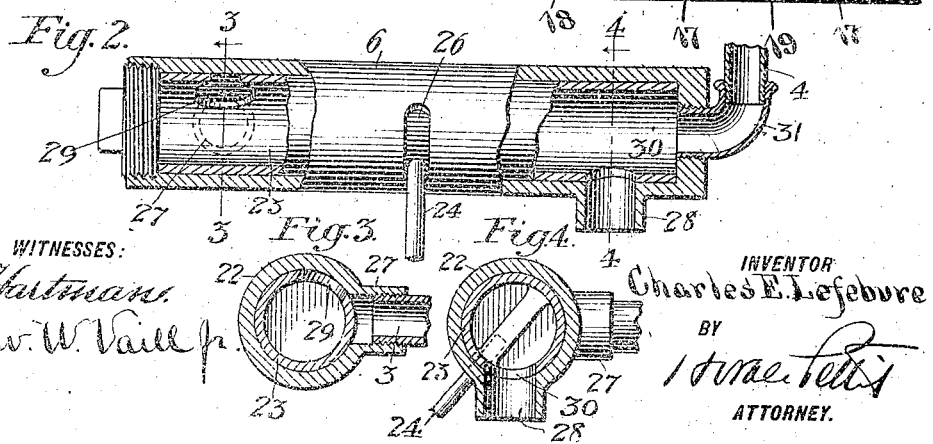

Figure 1 is a view showing my improved system applied to the bearings of a stationary engine; Fig. 2, a side elevation of a valve for controlling the supply of oil, shown partly in section; Fig. 3, a transverse section of said valve, taken on the line 3 3 of Fig. 2; and Fig. 4, a transverse section taken on the line 4 4 of Fig. 2.

Referring to the drawings, the numeral 1 indicates a filter for the oil of any approved construction, but preferably of the form shown in my prior patent, No. 652,543, issued June 26, 1900, or in my pending application, filed January 18, 1902, Serial No. 90,236, and is of such a construction that the filtering material may be renewed therein from time to time without stopping the filtering operation.

2 indicates an elevated pressure-tank, which is connected with the filter by the pipes 3 and 4.

5 indicates a pump for transferring or forcing the purified oil from the filter through the pipe 4 into the tank 2. At the upper end of said pipe 4 an automatic float-valve 6 is provided, which admits more or less oil to the tank 2, according to the level of the oil therein. The pipe 3 is also connected with said valve 6 in such a manner that when the oil is more or less prevented from flowing into said tank 2 the same is diverted into the pipe 3 and flows to the suction side of pump 5.

The details of the valve 6 are shown in Figs. 2 to 4, inclusive, and comprise an outer cylindrical casing 22 and an inner cylindrical oscillatory portion 23, to the latter of which the rod 24 is attached, which carries at its outer end the float 25. The rod 24 passes through the outer casing 22 by a slot 26, which is long enough to allow the maximum oscillation of the rod 24. The cylindrical casing 22 is provided with two hollow bosses or projections 27 and 28, the former of which is connected to the pipe 3 for returning the oil to the pump and also forms a port which is adapted to communicate with the opening 29 in the inner casing 23. The boss 28 provides an outlet-port through which the oil may enter the tank 2 and is adapted to communicate with the opening 30 in the inner casing 23. The supply-pipe 4 from the pump is connected with the outer end of the cylindrical casing 22 by means of an elbow 31. As will be seen by referring to Figs. 3 and 4, the openings 29 and 30 are so located in the cylindrical valve portion 23 that when one of said openings is completely closed the other is completely open; but as the rod 24 moves upwardly from the position indicated in Fig. 4 the opening 30 will be covered to a greater extent, while the opening 29 will be uncovered to the same extent, thereby diminishing the flow through the boss 28 and increasing the same through the boss 27 and the pipe 3. When the float 25 has reached the limit of its upward movement, the opening 29 will register with the opening in the boss 27 and there will be a communication through the interior of the valve from the pipe 4 to the pipe 3, so that no oil will enter the tank, but will circulate through said pipes and the pump 5. This arrangement provides a by-pass connection, so that the pump 5 may be continuously driven without affecting the level of the oil in the tank 2 should the demand upon the oil in the tank be made less from any cause. 8 indicates a pipe which leads from the tank 2 to the pipes which supply the oil directly to the bearings. This pipe 8 is provided at its upper end within the tank 2 with a strainer 8', which is for the purpose of preventing any foreign substance which may accidentally fall into said tank from entering said pipe and stopping the flow of oil.

The pipes 9, which supply the oil directly to the journal boxes or bearings, preferably enter fittings 10, upon which are mounted oil-cups 11 of the usual and well-known form, having a cylindrical reservoir from which the flow of oil is controlled by means of a needle-valve and which may also be provided with sight-feeds, if desired.

In the present instance means are shown for oiling the cross-head guides, the cross-head pin, the crank-pin, and the main fly-wheel pillow-blocks, there also being pipes, such as indicated at 12, for conveying the waste or used oil away from these points.

The pipe 8 is connected with the pipes 9 by a horizontal pipe 13, which is preferably placed beneath the floor of the room, and the pipes 12, which are also beneath the floor of the room wherever convenient, lead to the receiving-tank 14 of the filter 1.

The pipe 8, leading from the pressure-tank 2, may be provided with a valve or faucet 15, from which oil cans or pots may be filled for direct oiling by hand or for draining the oil from the tank 2 should occasion require.

For the purpose of adding new oil to the system I provide a reservoir, which may consist of an ordinary oil-barrel or may be a tank 16, which is connected by a pipe 17 to the pipe 4 before the same connects with the pipe 3 or the pump 5. The pipe 17 may also have a valve 18 for the purpose of shutting off the supply of new oil when the same is not being drawn upon. The pipe 19 is a drain from the settling-chamber of the filter to the waste-pipe of the building, and the pipe 20 indicates an overflow-pipe which connects with the aforesaid drain-pipe 19.

Suitable valves may be included in the pipes at any points desired, so as to control the flow of the oil in different portions of the system at different times. The system may even be entirely cut off from the engine or other machine and the oiling be accomplished by hand or by means of the oil-cups. 21 is a standard for the pipes and oil-cup for oiling the crank-pin.

It will be seen that by the system herein described the oil is fed to the journals and other bearings under a constant head or pressure with no danger of an overflow from the tank which supplies the necessary pressure to force the oil through the conducting-pipes. The system is made entirely automatic in its action, and the only attention necessary to be given to the same is when the filtering material is changed in the filtering-chambers of the filter. The pump for forcing the oil into the pressure-tank may be driven continuously without any danger of a greater supply of oil being delivered to said tank than is necessary, while at the same time a sudden demand may be made upon the tank, as in filling an oil-can, without in any way affecting the constancy of the supply to the bearings, since the automatic valve immediately compensates for any lowering of the level of the oil in the tank.

I do not wish to be limited to the details and arrangements of parts herein set forth, for changes may be made without departing from the spirit and scope of my invention, and my improved system may be adapted to any type of machines or to any character of building without essential changes in the material features of the invention.

Having thus described my invention, what I claim, and desire to protect by Letters Patent of the United States, is—

1. In a lubricating system, means for supplying oil under pressure due to gravity, ducts for conveying oil to the bearings to be lubricated, ducts for conveying the used oil away from said bearings, a filter for cleansing said oil, means for transferring oil from said filter to said pressure means, a duct for allowing the oil to circulate through said transferring means without entering said pressure means, and a valve for controlling the flow of oil in said last-named duct.

2. In a lubricating system, comprising a pressure-tank, ducts for conveying oil from said tanks to the bearings to be lubricated, a continuously-acting filter, ducts for conveying oil from said bearings to said filter, means for transferring oil from said filter to said pressure-tank, and a duct for allowing the oil to circulate through said transferring means without entering said pressure-tank.

3. In a lubricating system, a tank for supplying oil under pressure, a source of pure-oil supply for said tank, means for continuously transferring oil, a duct connecting said transferring means with said source of pure oil and said tank, and means for diverting the flow of oil from said tank through said transferring means when the height of oil in the tank is above normal.

4. In a lubricating system, a tank for supplying oil under pressure, a source of pure-oil supply for said tank, continuously-acting means for transferring oil from said source to said tank and means for diverting the flow of oil from entering said tank when the height of the oil in the tank is above normal whereby a less quantity of oil is supplied to said tank.

5. In a lubricating system, a source of supply of pure oil, a pressure-tank, means for delivering oil from said source to said pressure-tank, an automatic valve connected with said means for diverting the flow of oil from said tank when the oil in the tank is above its normal height and means for conducting said diverted oil back to said conveying means.

6. In a lubricating system, a continuous loop of conducting-pipes, one end of said loop being connected with an oil-supply, the other end of said loop having an automatic valve operated by the height of oil in a tank, a tank for said oil and means included in said loop for forcing oil therethrough, said valve serving to direct the flow of oil either into said tank or into the said portion of the loop.

7. In a lubricating system, a continuous loop of conducting-pipes including a pump, an end of said loop on the suction side of the pump being connected with an oil-supply, the other end of said loop having an automatic valve which operates as a delivery-valve or a by-pass valve operated by the height of oil in a tank, and a tank for said oil.

8. In a lubricating system, a filter, a pressure-tank for said system, a loop of conducting-pipes connecting said tank and said filter, means for forcing oil through one side of said loop and an automatic valve connected with one end of said loop for admitting oil to said tank or for passing the oil continuously through both sides of said loop operated by the height of the oil in said tank.

9. A lubricating system comprising a tank for supplying oil under pressure, ducts leading from said tank to the bearings to be lubricated, an oil-filter, ducts leading from the bearings to said oil-filter, a duct leading from said filter to said pressure-tank, a pump in said last-named duct, and an automatic valve at the upper end of said duct for admitting or diverting the oil passing through said duct to or from the said tank operated by the height of oil in said tank.

10. A lubricating system comprising a tank for supplying oil under pressure, ducts leading from said tank to the bearings to be lubricated, an oil-filter, ducts leading from the bearings to said oil-filter, a duct leading from said filter to said pressure-tank, a pump in said last-named duct, a return-duct from said tank to said pump and an automatic valve located at the upper ends of said ducts and in connection with said tank for admitting oil to the said tank or for diverting the same to the said return-duct operated by the height of the oil in said tank.

11. A lubricating system comprising a tank for supplying oil under pressure, ducts leading from said tank to the bearings to be lubricated, a continuously-acting oil-filter, ducts leading from the bearings to said oil-filter, a loop of conducting-pipes connecting said tank and said filter, means for forcing oil through the said loop and an automatic valve connected with one end of said loop for admitting oil to the said tank or for passing oil continuously through said loop operated by the height of oil in said tank.

In witness whereof I have hereunto set my hand this 5th day of June, A. D. 1903.

CHARLES E. LEFEBVRE.

Witnesses:
JOHN F. GRADY,
EDW. W. VAILL, Jr.